United States Patent
Gong

(10) Patent No.: US 9,691,084 B1
(45) Date of Patent: Jun. 27, 2017

(54) TARGETED ADVERTISING USING TEMPORAL ANALYSIS OF USER SPECIFIC DATA

(71) Applicant: Google Inc., Mountain View, CA (US)

(72) Inventor: Yitao Gong, San Jose, CA (US)

(73) Assignee: Google Inc., Mountain View, CA (US)

( * ) Notice: Subject to any disclaimer, the term of this patent is extended or adjusted under 35 U.S.C. 154(b) by 0 days.

(21) Appl. No.: 14/148,620

(22) Filed: Jan. 6, 2014

Related U.S. Application Data

(62) Division of application No. 12/052,101, filed on Mar. 20, 2008, now Pat. No. 8,626,575.

(51) Int. Cl.
 *G06Q 30/02* (2012.01)

(52) U.S. Cl.
 CPC ................................ *G06Q 30/0269* (2013.01)

(58) Field of Classification Search
 CPC ................................................. G06Q 30/0269
 USPC ...................................................... 705/35, 14
 See application file for complete search history.

(56) References Cited

U.S. PATENT DOCUMENTS

| | | | |
|---|---|---|---|
| 5,724,521 A | 3/1998 | Dedrick | |
| 5,740,549 A | 4/1998 | Reilly et al. | |
| 5,848,397 A | 12/1998 | Marsh et al. | |
| 5,948,061 A * | 9/1999 | Merriman et al. | 709/219 |
| 6,026,368 A | 2/2000 | Brown et al. | |
| 6,044,376 A | 3/2000 | Kurtzman, II | |
| 6,078,914 A | 6/2000 | Redfern | |
| 6,144,944 A | 11/2000 | Kurtzman, II et al. | |
| 6,167,382 A | 12/2000 | Sparks et al. | |
| 6,269,361 B1 | 7/2001 | Davis et al. | |
| 6,401,075 B1 | 6/2002 | Mason et al. | |
| 6,985,882 B1 | 1/2006 | Del Sesto | |
| 7,039,599 B2 | 5/2006 | Merriman | |
| 7,136,875 B2 | 11/2006 | Anderson et al. | |
| 7,685,199 B2 | 3/2010 | Chandrasekar et al. | |
| 7,756,868 B2 | 7/2010 | Lee | |
| 2001/0014868 A1 | 8/2001 | Herz et al. | |
| 2005/0043060 A1 | 2/2005 | Brandenberg et al. | |
| 2006/0235960 A1 | 10/2006 | Lai et al. | |
| 2007/0233513 A1 | 10/2007 | Lapstun et al. | |
| 2008/0103795 A1 | 5/2008 | Jakubowski et al. | |
| 2009/0043732 A1 | 2/2009 | Lee | |
| 2009/0164516 A1 | 6/2009 | Svendsen et al. | |
| 2009/0171755 A1 * | 7/2009 | Kane et al. | 705/10 |

(Continued)

FOREIGN PATENT DOCUMENTS

WO WO 97/21183 6/1997

OTHER PUBLICATIONS

U.S. Appl. No. 95/001,073, Reexamination of Stone et al., filed Sep. 30, 2004.

(Continued)

*Primary Examiner* — Edward Chang
(74) *Attorney, Agent, or Firm* — Fish & Richardson P.C.

(57) ABSTRACT

Methods, systems and apparatus, including computer program products are described for providing temporally relevant targeted content items. A set of user data is used to determine current user interests as indicated by one or more recent events. Content items relevant to those events are identified and ranked based on a time that the corresponding event occurred. One or more of the top ranked content items can be delivered to a user.

6 Claims, 7 Drawing Sheets

(56) References Cited

U.S. PATENT DOCUMENTS

2010/0223261 A1  9/2010  Sarkar

OTHER PUBLICATIONS

U.S. Appl. No. 95/001,061, Reexamination of Stone et al., filed Sep. 3, 2002.
U.S. Appl. No. 95/001,069, Reexamination of Dean et al., filed Jul. 11, 2002.
U.S. Appl. No. 95/001,068, Reexamination of Stone et al., filed Dec. 7, 2002.
AdForce, Inc., A Complete Guide to AdForce, Version 2.6, 1998.
AdForce, Inc., S-1/A SEC Filing, May 6, 1999.
AdKnowledge Campaign Manager: Reviewer's Guide, AdKnowledge, Aug. 1998.
AdKnowledge Market Match Planner: Reviewer's Guide, AdKnowledge, May 1998.
Ad-Star.com website archive from www. Archive.org, Apr. 12, 1997 and Feb. 1, 1997.
Baseview Products, Inc., AdManagerPro Administration Manual v. 2.0, Dec. 1998.
Baseview Products, Inc., ClassManagerPro Administration Manual v. 1.0.5, Feb. 1, 1997.
Business Wire, "Global Network, Inc. Enters Into Agreement in Principle With Major Advertising Agency," Oct. 4, 1999.
Information Access Technologies, Inc., Aaddzz brochure, "The Best Way to Buy and Sell Web Advertising Space," © 1997.
Information Access Technologies, Inc., Aaddzz.com website archive from www. Archive.org, archived on Jan. 30, 1998.
Zeff, R. et al., Advertising on the Internet, 2nd Ed., John Wiley & Sons, 1999.
Dedrick, R., Interactive Electronic Advertising, IEEE, 1994.
Dedrick, R., A Consumption Model for Targeted Electronic Advertising, Intel Architecture Labs, IEEE, 1995.
Request for Reexamination of U.S. Pat. No. 7,240,025 B2, Control No. 95/001,073, Sep. 30, 2004.
Request for Reexamination of U.S. Pat. No. 6,446,045 B1, Control No. 95/001,061, Sep. 3, 2002.
Request for Reexamination of U.S. Pat. No. 7,249,059 B2, Control No. 95/001,069, Jul. 11, 2002.
Request for Reexamination of U.S. Pat. No. 6,829,587 B2, Control No. 95/001,068, Dec. 7, 2002.

\* cited by examiner

| KEYWORD | TEMPORAL WEIGHT | ADVERTISMENT | INITIAL RANKING | ADJUSTED RANKING |
|---|---|---|---|---|
| BICYCLE | 1 | HELMET | 0.94 | 0.94 |
| | | GLOVES | 0.75 | 0.75 |
| | | BIKE SHORTS | 0.10 | 0.10 |
| HEADPHONES | 0.88 | MP3 PLAYER 1 | 0.98 | 0.86 |
| | | MP3 PLAYER 2 | 0.89 | 0.78 |
| | | MP3 PLAYER 3 | 0.82 | 0.72 |
| WATER BOTTLE | 0.42 | WATER PACK | 0.76 | 0.32 |
| | | RUNNING SHOES 1 | 0.27 | 0.11 |
| | | SPRING WATER 1 | 0.19 | 0.08 |
| HEART RATE MONITOR | 0.21 | ENERGY BARS | 0.97 | 0.20 |
| | | RUNNING SHOES 2 | 0.27 | 0.06 |
| | | SPRING WATER 2 | 0.19 | 0.04 |

FIG. 5A

| ADVERTISMENT | ADJUSTED RANKING |
|---|---|
| HELMET | 0.94 |
| MP3 PLAYER 1 | 0.86 |
| MP3 PLAYER 2 | 0.78 |
| GLOVES | 0.75 |
| MP3 PLAYER 3 | 0.72 |
| WATER PACK | 0.32 |
| ENERGY BARS | 0.20 |
| RUNNING SHOES 1 | 0.11 |
| BIKE SHORTS | 0.10 |
| SPRING WATER 1 | 0.08 |
| RUNNING SHOES 2 | 0.06 |
| SPRING WATER 2 | 0.04 |

TARGETED ADVERTISING USING TEMPORAL ANALYSIS OF USER SPECIFIC DATA

CROSS-REFERENCE TO RELATED APPLICATION

This application is a divisional application of and claims the benefit of priority to U.S. patent application Ser. No. 12/052,101, entitled "Targeted Advertising Using Temporal Analysis of User Specific Data", filed on Mar. 20, 2008, the disclosure of which is incorporated herein by reference in its entirety.

BACKGROUND

This specification relates to content presentation.

Targeted advertising directs advertising efforts toward individuals or groups having one or more characteristics that are thought to indicate a higher likelihood of those individuals or groups being interested in purchasing the goods, and/or services being advertised. Effective implementation of targeted advertising often depends on the quality of the user or group data available and the actual correlation between the sought for characteristics and actual interest in the goods, services, and/or information being offered.

Advertising over conventional mediums such as print, radio, and television permits advertisement targeting based on the content of the print articles, radio programs, and television programs into which the advertisements are placed. Advertisers generally select the content into which their advertisements are to be placed based on a correlation between the type of content and a projected interest of an audience of that content in a given product or service being advertised.

The Internet offers a new medium for delivering user-targeted messages and/or advertising. One form of targeted advertising on the Internet generally involves an analysis of content of a web page by a computer program to select an advertisement for display based on, for example, keywords associated with the advertisement and a relationship between those keywords and the content of the web page. The advertisement selected being targeted to the user based on the presumption that if the user is visiting the webpage and the advertisement is selected based on the content of the webpage, the user will be or might be interested in the selected advertisement.

SUMMARY

In general, one aspect of the subject matter described in this specification can be embodied in methods that include the actions of identifying an event associated with a user, identifying candidate content items for presentation to the user, adjusting a rank of the candidate content items based on a time associated with the event, and selecting one or more highest ranked candidate content items from a list of adjusted rank candidate content items for presentation to the user.

In particular implementations, the method includes, receiving a request to process a transaction between a user and a merchant, and after selecting one or more highest ranked content items, sending the one or more highest ranked content items for display to the user. The content items can include advertisements provided by registered merchants of a payment system.

In particular implementations, the method includes, receiving a request to identify one or more content items to be placed on a web page of an Internet publisher for display to a user, and after selecting one or more highest ranked content items, sending the one or more highest ranked content items for display to the user.

In particular implementations, adjusting the rank of the candidate messages includes generating a temporal weight for each set of candidate content items, and applying the temporal weight to the ranking of each candidate content item in the set. The temporal weight can be a decimal value that is applied to the rank by multiplying a ranking score by the temporal weight to arrive at an adjusted ranking.

In particular implementations, the method includes, displaying the one or more highest ranked advertisements to the user. The corpus of user data can include a user purchase history. The corpus of user data can include user wish list information. The corpus of user data can include user data for one or more applications offered by a distributed applications provider. The messages can include advertisements. The events can include past user purchases. The events can comprise adding items to a wish list. The messages can include a hyperlink. Candidate messages can be filtered by applying a whitelist or a blacklist. Other embodiments include corresponding systems, apparatus, and computer program products.

Particular embodiments of the subject matter described in this specification can be implemented to realize one or more of the following advantages. Targeted content items or advertisements can be selected for delivery to a user based on user events recorded in a corpus of user data. Messages can be selected in real time or near real time based on the user data such that the targeted message is chosen according to recent events that have a likelihood of indicating a given user's current interests.

The details of one or more embodiments of the subject matter described in this specification are set forth in the accompanying drawings and the description below. Other features, aspects, and advantages of the subject matter will become apparent from the description, the drawings, and the claims.

BRIEF DESCRIPTION OF THE DRAWINGS

FIG. 5A is a table illustrating example relationships between keywords, temporal weights, advertisements, and adjusted rankings.

FIG. 5B is a table showing example advertisements ordered according to their adjusted ranking.

DETAILED DESCRIPTION

Figure 1:
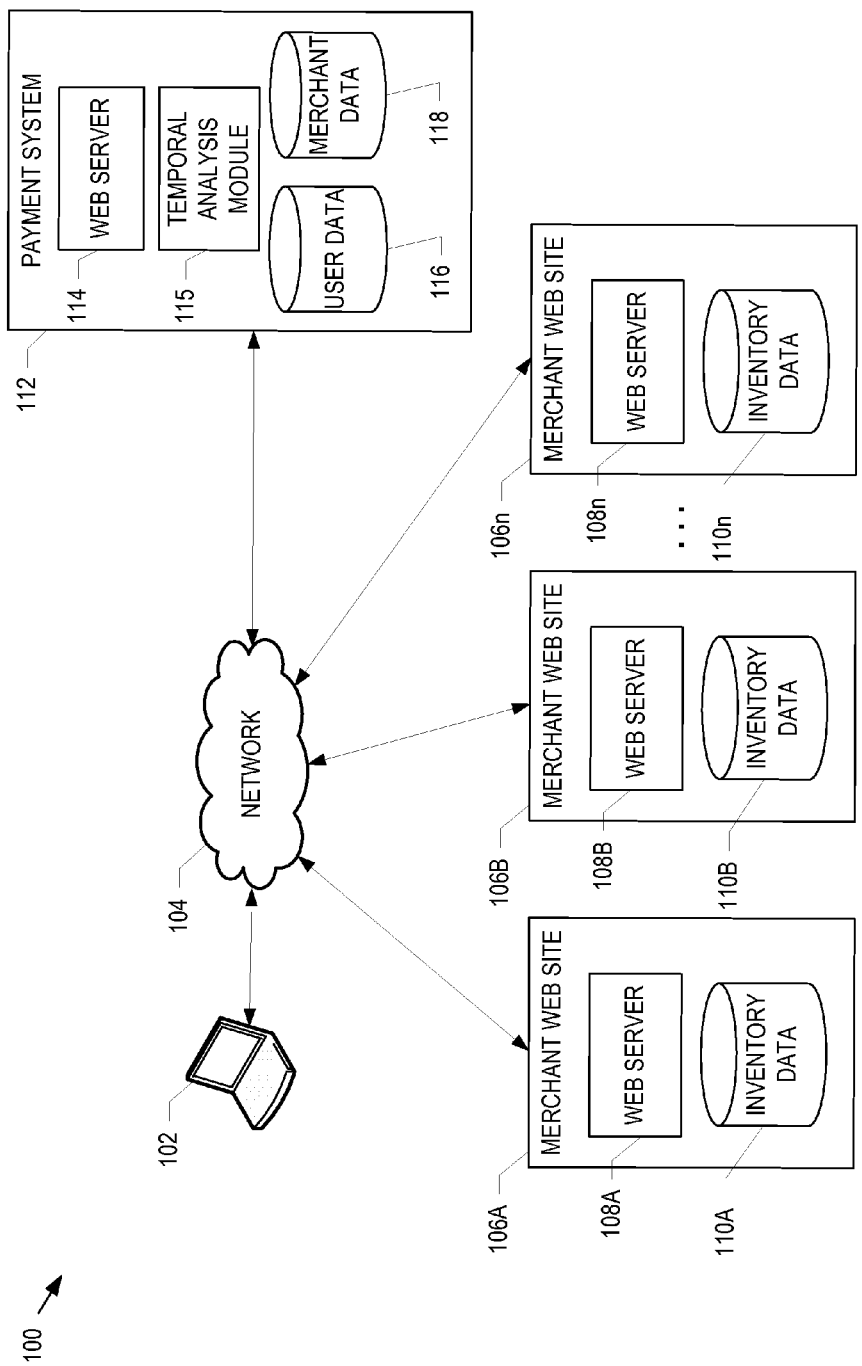
FIG. 1 is a block diagram of an example environment of a temporal analysis module used in a payment system.

FIG. 1 is a block diagram of an example environment 100 of a temporal analysis module 115 used in a payment system 112. A user of the computer 102 can access one or more of the merchant web sites 106A-106n. For example, the user can direct a web browser on the computer 102 to a URL corresponding to the merchant web site 106A. The web server 108A can return HTML to the web browser which renders a web page on a display of the computer 102. The user can browse the web site using the browser controls, viewing, for example, product information for products offered for sale by the merchant.

The web server 108A can retrieve product information from the inventory datastore 110A. The datastore can be a collection of files (e.g., HTML files, image files, etc.) and/or inventory information stored in, for example, an SQL database. The web server 108A can include the retrieved product information in web pages served to the user computer 102. Using the web browser, the user can select products offered on the merchant web pages for purchase.

Merchant websites 106B-106n offer similar interfaces to products and/or services offered for sale, and the user can select products for purchase by visiting these merchant web sites as well.

To complete an online transaction, merchant web sites 106A-106n can accept, for example, a credit card number, or some other form of payment capable of being processed electronically. Merchant web sites registered with the payment system 112 forward users to the payment system 112 for payment processing. For example, upon receiving a user indication that he or she wishes to make a purchase (e.g., by selecting a checkout button) the merchant websites 106A-106n forward the web browser of the user computer 102 to the payment system 112. The web server 114 of the payment system 112 then sends HTML to the web browser to provide an interface to the user computer 102 that can, for example, prompt for and accept information from the user to complete the sale, with the user computer 102 functioning as a user interface device.

The payment system 112 can store billing information entered by the user into the user datastore 116 in association with a user identifier (user id). Data corresponding to a given user can be stored in the user datastore 116 in association with that user's user id. The system can issue a login name (this could be the same as the user id) and a password to the user to protect the stored information. Upon the user making a later purchase from a merchant website 106A-106n (that uses the payment system 112 for order processing) the user does not have to reenter the previously entered information. The user id and password can instead be provided by the user to the payment system 112 which can use the user id to retrieve the user's account information to process a payment. The payment system 112 also stores transaction information for the user. For example, the transaction information can be stored in the user datastore 116. The transaction information can include, for example, a list of items purchased, a date and/or time of purchase, and an amount paid.

The payment server 112 functions as a trusted intermediary between users and merchants. Users can enter information once and trust that it will remain secure and not be misused. Merchants can register with the payment system 112 so that the payment system 112 can process merchant payments.

Prior to forwarding a user to the payment system 112, each of the merchant web sites registers with the payment system 112. For example, a web site administrator of the merchant web site 106A can use a computer to access a user interface provided by the web server 114 to register the merchant with the payment system. The payment system can create an account for the merchant having a merchant identifier (merchant id) that can be stored in association with corresponding merchant records in the merchant datastore 118. The registration process can include providing merchant details such as a business name, location, bank account information, and inventory data. In some implementations, merchants can upload one or more advertisements corresponding to goods and/or services offered at the merchant's website. In some implementations, the payment system generates one or more advertisements for a merchant based on the merchant's uploaded inventory data. For example, a product description, image, and price can be used to create an advertisement for that product.

In some implementations, the registration process also includes creating an advertisement filter to be associated with the merchant account. For example, the payment system 112 can present a list of other registered merchants to a merchant administrator who can then include (whitelist) or exclude (blacklist) one or more merchants to create a filter. The payment system 112 can use the filter in selecting advertisements for display to users that have been forwarded to the payment system 112 by the merchant website (corresponding to the administrator who created the filter). Merchants placed on a whitelist can, for example, be merchants that the registering merchant does not view as a competitor. Merchants placed on the blacklist can, for example, be merchants that the registering merchant sees as direct competitors or that the registering merchant thinks that forwarded users might find offensive.

The merchant id can be provided to the payment system 112 by a merchant web site 106A-106n upon that site forwarding a user to the payment system 112 for completing a transaction. Funds received from the user can be transferred by the payment system 112 to an account associated with the merchant id of the forwarding merchant.

During (or following) the checkout process, the payment system 112 can present one or more advertisements to the user on one or more payment processing pages. For example, the payment system 112 can present merchant advertisements for other registered merchants on a transaction confirmation and/or a "thank you" page presented by the payment system 112. The advertisements displayed can be selected from merchant advertisements stored in the merchant datastore 118 (subject to the filter created by the merchant for whom a payment is being processed).

The payment system's presentation of advertisements during the checkout process promotes both further use of the payment system 112 and additional user commerce with registered merchants. Because the advertisements are directed toward merchants that are registered with the payment system, the user can purchase from advertised merchants without entering redundant information (e.g., billing information, shipping information, etc.)

The payment system can increase the benefit of presented advertisements by targeting the advertisement to the interests of the individual user to which the advertisement is to be presented. In selecting advertisements for display, the payment system can utilize a temporal analysis module 115. The temporal analysis module can examine the corpus of user data in the user datastore 116 to select advertisements from the corpus of advertisements that are relevant to the user's interests as indicated by the user's current, recent, and/or desired purchase activity. The temporal analysis module 115 can be a computer program running on server hardware.

Figure 2:
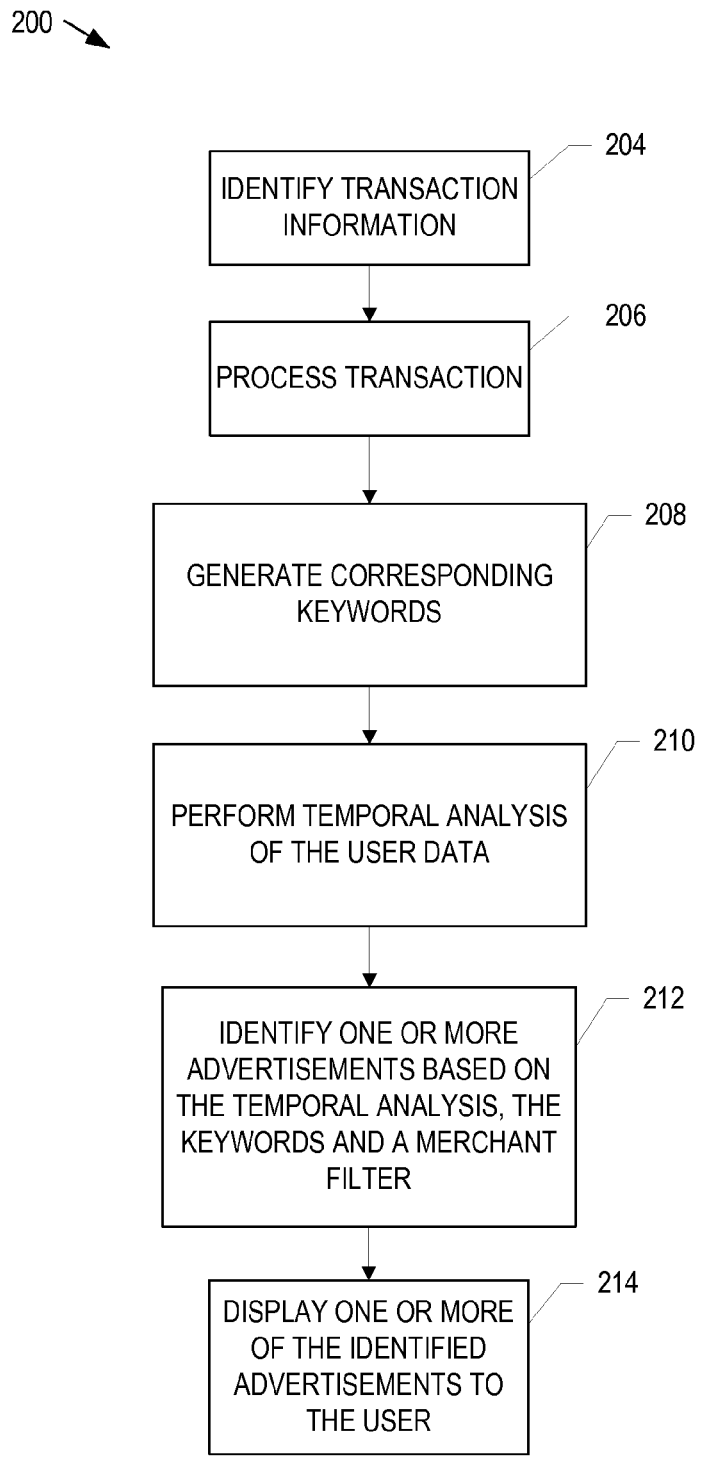
FIG. 2 is a flowchart of an example method for providing an advertisement based on a temporal analysis of user data.

FIG. 2 is a flowchart of an example method 200 for providing an advertisement based on a temporal analysis of user data. The method is described with respect to an example system implementing the method, the payment system 112, for example. Transaction information is identified (204). For example, a merchant server can forward a user that has initiated a checkout procedure to the payment system 112. The transaction information can include, for example, the forwarding merchant id, and a list of products to be purchased by the user. An associated transaction can be processed (206). For example, the user can login to the payment system by entering a user id and password. In some implementations, a web browser cookie stored in the user's computer can provide the user's identifying information. One or more keywords and/or key phrases that correspond to respective user events recorded in the user data are generated (208). With the user's identity established, the system can examine the user data associated with the user id to generate one or more keywords and/or key phrases that correspond to a respective user events recorded in the user data. For the remainder of this description the term "keyword" refers to both a single word keyword and a multiple word key phrase unless otherwise stated. A temporal analysis of the user data can be performed, reviewing user events recorded in the user data (210). One or more advertisements are identified based on the temporal analysis, the keywords, and a merchant filter for the forwarding merchant id (212). One or more of the advertisements are displayed to on a web page served to the user's computer (214). For example, an advertisement can be displayed on a payment processing page, a confirmation page, and/or a thank you page. A displayed advertisement can include a hyperlink that directs the user's web browser to the advertised merchant's web site upon user selection of the advertisement.

Figure 3:
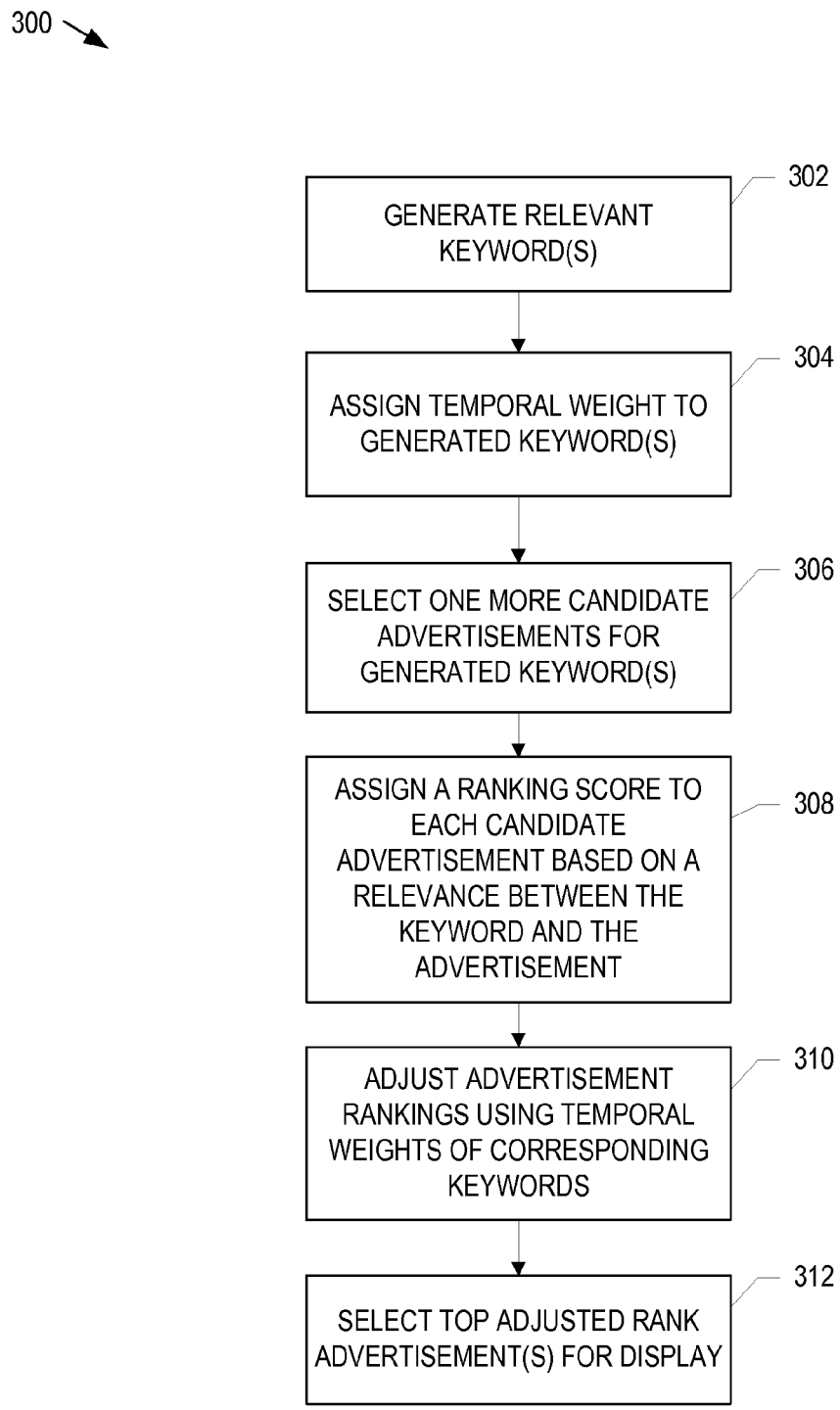
FIG. 3 is a flowchart of an example method for selecting one or more advertisements for display based on a temporal analysis of user data.

FIG. 3 is a flowchart of an example method 300 for selecting one or more advertisements for display based on a temporal analysis of user data. The method is described with respect to a system implementing the method. One or more keywords relevant to the user data are generated (302). For example, a temporal analysis module can examine purchase history and/or wish list information to extract one or more keywords. A purchase history can include one or more item identifiers corresponding to items purchased and a time of purchase stored in association with a user id (of the user that made the purchase). A wish list can include one or more item identifiers corresponding to items that a user has indicated that he or she would like to purchase and a time this indication was made stored in association with a corresponding user id.

A temporal weight is assigned to the keyword(s) (304). A temporal weight can, for example, be based on a comparison of the time that a user event recorded in the user data (e.g., a purchase) was performed with the current time. In some implementations, the temporal weight of a given keyword is based on how recently the event (from which the corresponding keyword was generated) occurred. For example, a temporal weight between 0 and 1 can be assigned to a keyword of "bicycle" generated from records in a user's purchase history corresponding to a past purchase of a bicycle, where the value of the weight depends on how long ago the purchase was made. A temporal weight for a keyword generated from a user wish list item can, for example, be based on how recently the user added the item to their wish list.

One or more candidate advertisements are selected for the generated keywords (306). For example, the system can search of a pool of advertisements using a first generated keyword to return candidate results and then search the pool of advertisements using a second generated keyword, etc. In some implementations, the system compares a given generated keyword with one or more keywords stored in association with an advertisement. In some implementations the system compares a given generated keyword with product descriptions of products advertised in the advertisements. A ranking score is assigned to candidate advertisements based on their relevancy to the corresponding keyword that resulted in their identification (308).

The ranking scores of the candidate advertisements are adjusted using the temporal weights of the corresponding keywords (310). For example, if the keyword "bicycle" has a temporal weight of 0.8 and resulted in the identification of three candidate advertisements, the ranking scores of those three candidate advertisements can be multiplied by 0.8 to adjust their ranking. One or more top adjusted rank advertisements are selected for display to a user (312).

Figure 4:
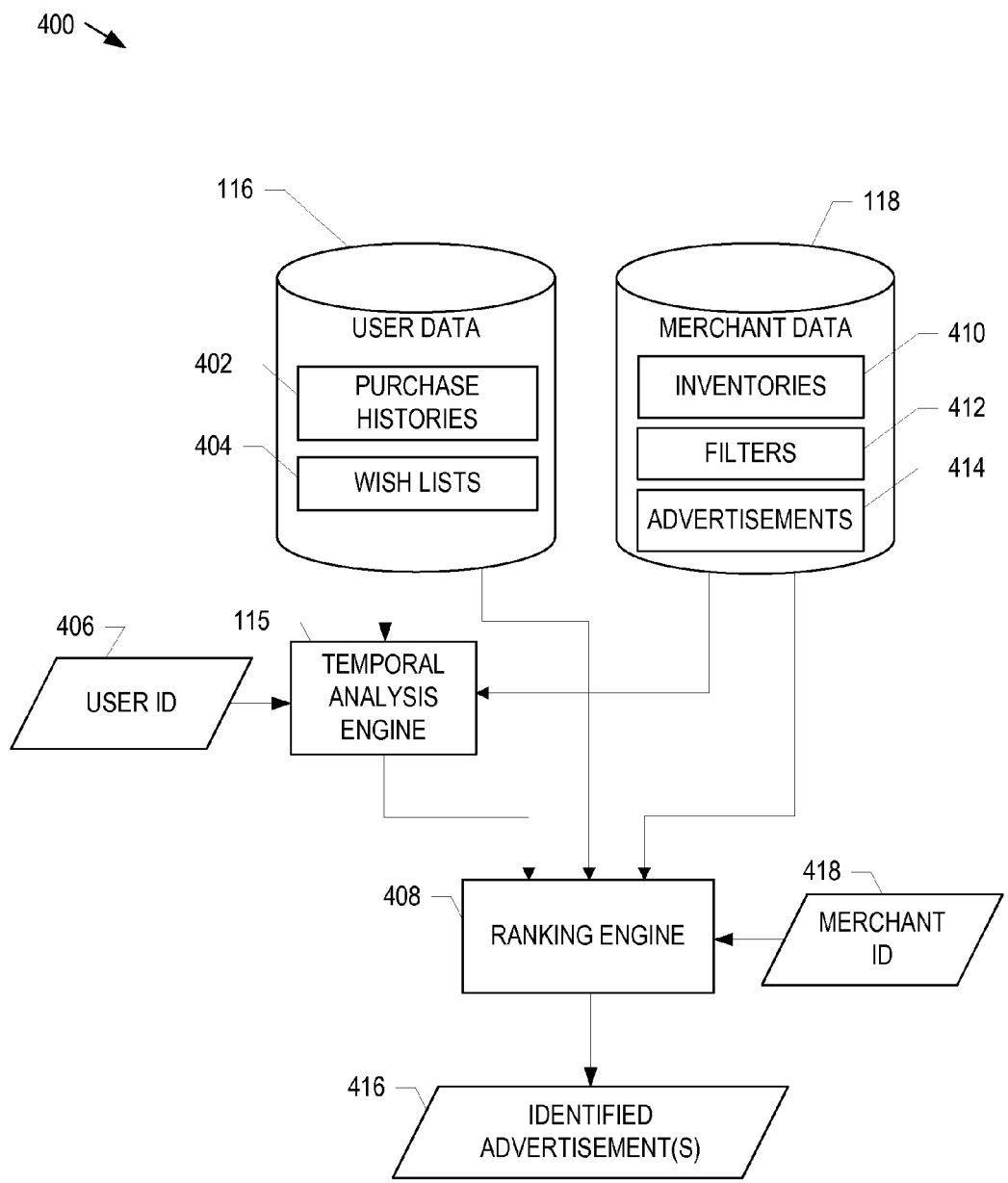
FIG. 4 is a diagram illustrating example information flow during an advertisement identification process incorporating temporal analysis.

FIG. 4 is a diagram 400 illustrating example information flow during an advertisement identification process incorporating temporal analysis. User data from the user datastore 116, including, for example, user purchase histories 402 and user wish lists 404 can be provided to the temporal analysis module 115.

A temporal weight generated by the temporal analysis module 115 for a given keyword is a dependent on the content of the user data 116. The temporal weight is based on user events recorded in the user data and times associated with those events. The temporal weight for a given keyword, for example, can be a function of that keyword, a user purchase history, a user wish list, other collected user data, and time (as associated with the user data records).

The user id 406 is provided to the temporal analysis module 115. Using the user id 406, the temporal analysis module 115 can select purchase history 402 and/or wish list 404 information specific to the user corresponding to the user id. For example, the temporal analysis module 115 can examine all purchase history information and wish list information stored in association with the received user id.

The temporal analysis module 115 can examine the user data (purchase history and/or wish list) to generate one or more keywords that correspond to a respective user activity represented in the user data. The temporal analysis module can assign a temporal weight to each of the keywords based on the time at which the user activity corresponding to the keyword occurred relative to a current time. For example, a keyword can be extracted from a purchase history that includes a product description, or by reading a product description from inventory information 410 in the merchant datastore 118.

In some implementations, a temporal weight is a decimal value that ranges from 0 to 1. Higher temporal weights, for example, can be assigned to keywords that correspond to more recent user activity.

The temporal analysis module 115 can provide one or more keyword-temporal weight pairs to the ranking engine 408. A merchant id 418 of the forwarding merchant for the transaction being processed can be provided to the ranking engine 408. The merchant id can be used, for example, to obtain the merchant's filter information 412 from the merchant datastore 118. The ranking engine 408 can use the one or more keywords supplied by the temporal analysis module 115 to identify a number of candidate advertisements from the advertisements 414 stored in the merchant datastore 118. The ranking engine can ignore advertisements for blacklisted merchants and/or search only advertisements for whitelisted merchants. In some embodiments, in addition to or in lieu of existing advertisements stored in the merchant datastore 118, candidate advertisements can also be generated by, for example, the payment system 112, to advertise items stored in the inventory information 410 having descriptions that are related to the keywords.

The candidate advertisements identified by the ranking engine 408 can be assigned a ranking score by the ranking engine based on their relevance to a keyword provided by the temporal analysis module 115. The ranking engine 408 uses the temporal weights assigned by the temporal analysis module to adjust the ranking of the candidate advertisements. In some implementations, the ranking of candidate advertisements that are identified based on a given keyword are multiplied by the temporal weight assigned to that keyword. The result is a list of candidate advertisements having an adjusted rank.

The top ranked advertisement or an integer number of the top ranked advertisements 416 are identified. The identified advertisement or advertisements are presented to the user.

FIG. 5A is a table illustrating example relationships between keywords, temporal weights, advertisements, and adjusted rankings. The "keyword" column includes examples of keywords generated using user data. For example, a purchase history of a given user can include records of the following events in the order listed: the user purchased a heart rate monitor, the user purchased a water bottle, the user purchased a set of headphones, and the user purchased a bicycle. In the example shown, "bicycle" has been assigned a temporal weight of 1. The weight of 1 can be assigned, for example, because the user just purchased (or very recently purchased) the bicycle. For example, the merchant selling the bicycle can be the merchant that forwarded the user to the payment system. The keywords "headphones", "water bottle", and "heart rate monitor" have decreasing temporal weights representative of the time their corresponding user event occurred.

The "advertisement" column includes the names of items advertised in candidate advertisements that correspond to the keywords. For example, a search of advertisements stored in a payment system using the keyword "bicycle" returned advertisements for a helmet, gloves, and bike shorts having (initial) rankings of 0.94, 0.74, and 0.10 respectively based on a relevance of the advertisement to the keyword. The initial rankings are multiplied by the temporal weights of the corresponding keywords to arrive at an adjusted ranking for each advertisement shown in the rightmost column.

FIG. 5B is a table showing example advertisements ordered according to their adjusted ranking. The example advertisements and adjusted rankings shown correspond to those of FIG. 5A. The three highest ranked advertisements 500 can be selected for display to a user, for example, on a payment confirmation page of a payment system.

The adjustment of the ranked advertisements using the temporal weights generally tends to lower the rank of advertisements that correspond to older keywords. That is, the rankings of advertisements that correspond to more recent user events are reduced less than the rankings of advertisements corresponding to events that occurred further in the past. This tends to cause advertisements related to more recent events to be moved to the top of a rankings list, representative of the notion that more recent user events can be more indicative of a user's current interests than older events. The advertisements can advertise goods and/or services of registered merchants across a payment system and are not limited to merely advertising goods and services of a single merchant. The advertisements selected for display to the user are customized to that user's current interests as indicated, for example, by their purchase history and/or other user data available to a payment system. The advertisements can be considered to be delivered just-in-time as that term is used to refer to a delivery that is customized to match one or more parameters in real time or near real time.

Figure 6:
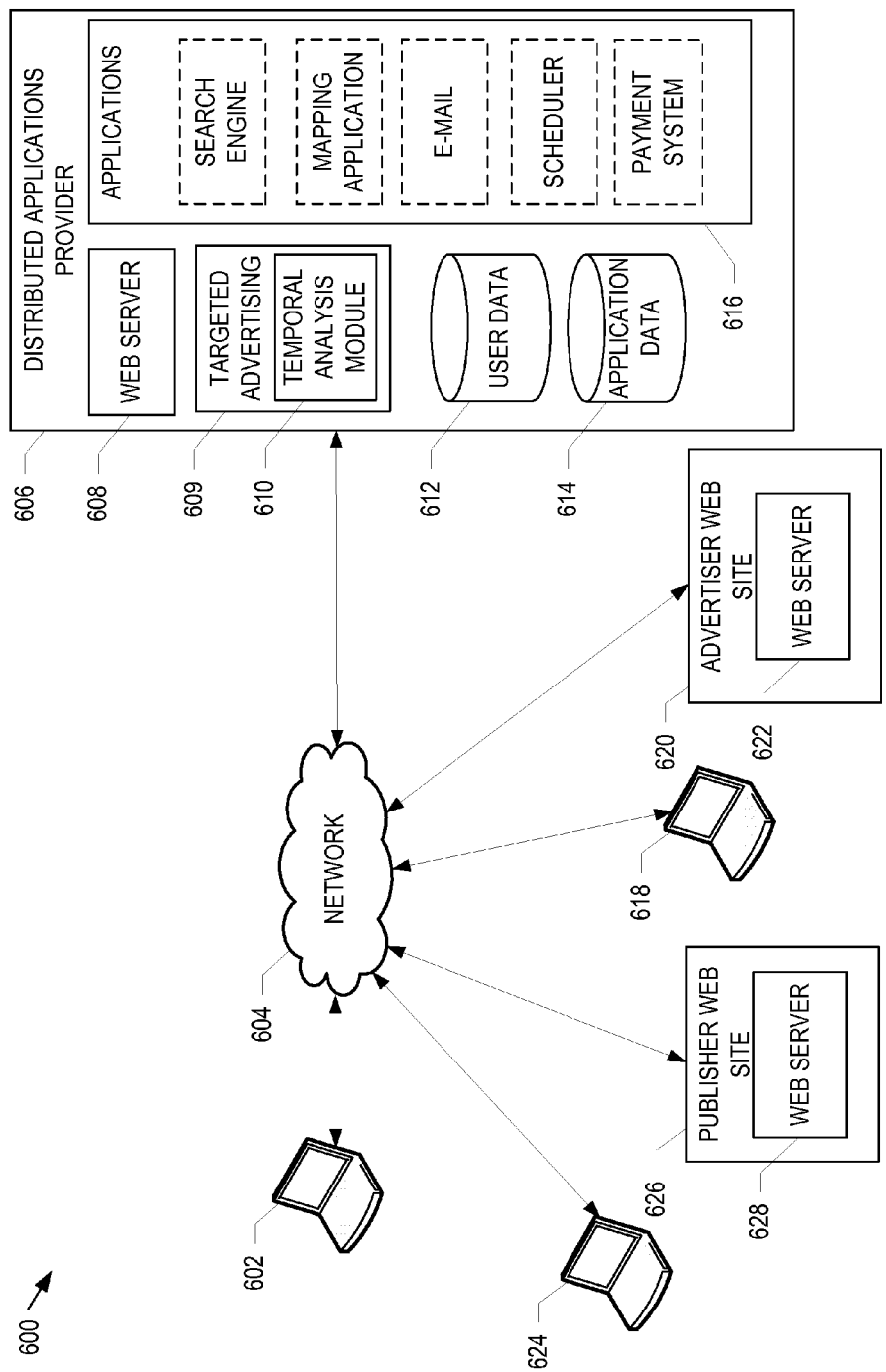
FIG. 6 is a block diagram of an example environment of a temporal analysis module used in a distributed applications provider.

FIG. 6 is a block diagram of an example environment 600 of a temporal analysis module 610 used in a distributed applications provider 606. In some implementations, a distributed applications provider utilizes a temporal analysis module to serve just-in-time targeted advertisements on application display screens and/or affiliated publisher web pages that direct users to advertiser web sites. A user of the computer 602 can direct a web browser of the computer to a web server 608 of the distributed applications provider 606. The web server can serve one or more user interface web pages to the web browser for display on a display device of the computer 602. The computer 602 can display the user interface web pages to a user of the computer 602, where the computer 602 functions as a user interface device. The distributed applications provider 606 includes a targeted advertising application having a temporal analysis module 610, a user datastore 612, and an application datastore 614. The distributed applications provider 606 can also include one or more applications 616, for example, a search engine interface, an email application, a scheduling application, a mapping application, and a payment system application.

A user of the computer 602 can access the applications 616 through the web server 608 which can, for example, serve user interface pages for the applications 616 or forward the user's web browser to one or more additional web servers that serve interface pages for the applications 616. The user can register with the distributed applications provider to, for example, gain access to enhanced application features, e.g., user preference settings for a search engine and/or a mapping application, and/or to use applications for which a user login is generally needed in order for the applications to function, e.g., e-mail, a scheduling application, and/or a payment system. The distributed applications provider 606 provides the user with a user id and assigns a password. The user can later provide the user id and password to verify the user's identity for subsequent uses of one or more of the applications.

The distributed applications provider 606 can store the user id in association with user data in stored in the user datastore 612 that corresponds to user activity using the applications 616. For example, user preferences for the search engine and mapping application, a user query history (e.g., storing past queries entered into the search engine by the user), a user click history (e.g., storing hyperlinks that the user has previously clicked on), sent and received e-mail, scheduled events entered into a scheduling application, and/or billing and shipping information entered by the user into a payment system can be stored in association with the user id in the user datastore 612. The application datastore 614 can store data used by the applications, for example, a corpus of resources searched by the search engine, mapping data used by the mapping system, and/or advertisements uploaded by one or more advertisers to the targeted advertising application 609.

An advertiser administrator using the advertiser computer 618 can upload one or more advertisements to the distributed applications provider 606. Uploaded advertisements can include related keyword designations, and a bid amount that the advertiser agrees to pay to the distributed applications provider 606 upon the satisfaction of a given criteria (e.g., the advertisement is displayed, or the advertisement is selected by a user). The uploaded advertisements can include a link for forwarding a user's web browser to a web server 622 of an advertiser web site 620.

A publisher administrator using the publisher computer 624 can register with the distributed applications provider to display advertisements along with content of the publisher web site 626. The distributed applications provider can provide scripts for installation on one or more web pages served by the web server 628 that will permit the distributed applications provider 606 to dynamically insert advertisements into the web pages as they are displayed on a user's computer who visits the publisher website. The publisher administrator can also use the computer 624 to submit whitelisted and/or blacklisted advertisers to control what advertisements are displayed with the publisher's website content.

A user of the computer 602 visiting the publisher web site 626 is provided with the web site content of the site as well as one or more advertisements identified by the targeted advertising application for display on the web page. Conventionally, keyword designations provided with advertisements uploaded by advertisers are used to match advertisements with website content that is relevant to the advertisement. The targeted advertising application 609 using the temporal analysis module 610 can instead, or in addition, identify and display advertisements on the web page that are identified based on advertisement keywords and a temporal analysis of user data stored in the user datastore 612.

A temporal weight generated by the temporal analysis module 610 for a given keyword is a dependent on the user data 612 which can be user data corresponding to any or all of the applications 616. The temporal weight for a given keyword, for example, can be a function of that keyword, user searches using the search engine and/or mapping application, recently received email messages, scheduled events, as well as a user purchase history, a user wish list, any other collected user data, and time (as associated with events recorded in the user data).

In some implementations, user data for a scheduler application can be used in generating keywords and assigning temporal weights for future events. For example, if a user has a scheduler application (e.g., an application that includes a calendar for a user to create a schedule) entry entitled, "Trip to Hawaii" the keywords/keyphrases "vacation", "Hawaii", and/or "Hawaii vacation" can be generated based on this user data. Entries for "Mom's Birthday", and "My Wedding Day", for example, can be treated in a like manner. A temporal weight can be assigned to these keywords based on the date of the entry in the scheduler application. These keywords and corresponding temporal weights can be used to select one or more content items (e.g., advertisements or others messages) for display to the user. In some implementations, temporal weights for future events are decimal values between 0 and 1, and are higher for events that are scheduled to occur sooner. In some implementations, analysis and ranking of future events is combined with that of past events recorded in user data in selecting one or more content items for display to a user.

Figure 7:
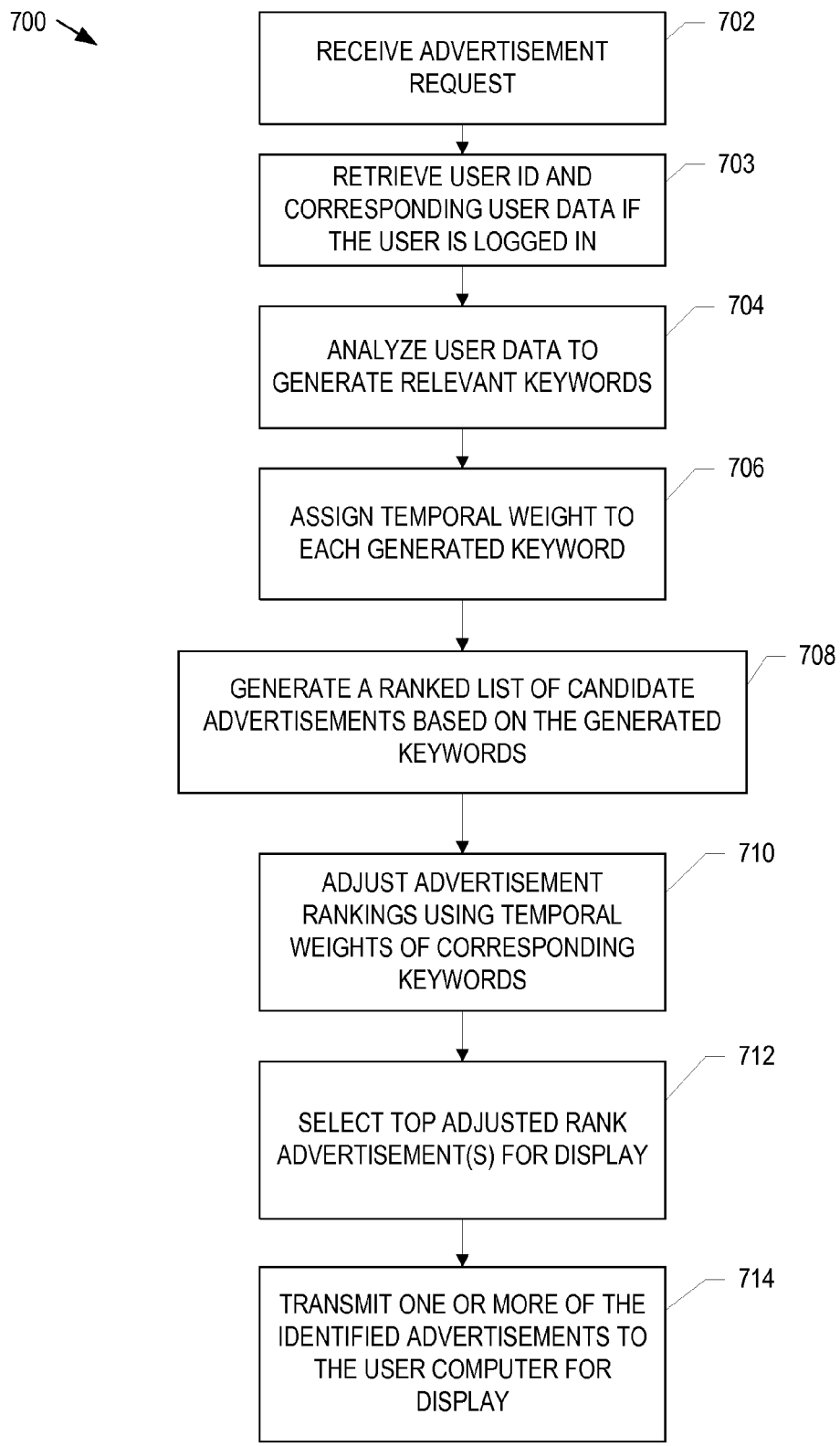
FIG. 7 is a flowchart of an example method for displaying one or more targeted advertisements on a publisher web site based on a temporal analysis of user data.

FIG. 7 is a flowchart of an example method 700 for displaying one or more targeted advertisements on a publisher web site based on a temporal analysis of user data. The method is described in reference to a system implementing the method. A request is received (e.g., from a user computer) for a targeted advertisement (702). For example, one or more scripts in a publisher web page sent to a web browser of the user computer can instruct the web browser to request one or more advertisements from a targeted advertising system for display with the content of the publisher web page. A user id of the user, and corresponding user data if the user is registered with and logged into the system, is retrieved (703). If, for example, the user of the computer has a user id with a distributed applications provider and is currently logged in, the user's information can be retrieved from the corpus of user data in the user datastore of the distributed applications provider. The user's login state can be maintained, for example, by a web browser cookie stored on the user computer.

User data is analyzed to generate relevant keywords (704). For example, a temporal analysis module of a distributed applications provider can search the user data for events corresponding to each of the generated keywords. A respective temporal weight is assigned to each keyword based on the temporal analysis (706). In some embodiments, the system can assign a decimal value between 0 and 1 to each of the keywords based on the time of occurrence of an event corresponding to the keyword. For example, keywords corresponding to recent events can be assigned a value closer to 1, while older events are assigned lower values. A ranked list of candidate advertisements is generated based on the generated keywords (708). For example, a corpus of advertisements stored in a targeted advertising system can be searched using each of the generated keywords, with each search producing a list of ranked results.

The rankings of the candidate advertisements can be adjusted using the temporal weights of the corresponding keywords (710). For example, a candidate advertisement's ranking can be multiplied by the temporal weight of the keyword that led to the identification of the candidate result. One or more of the top ranked advertisements (based on the adjusted rank) are selected for display to the user (712) and transmitted to the user computer for display (714).

In addition to providing targeted advertisements for display on publisher web pages, the system 600 can also perform a temporal analysis of user data in order to select one or more advertisements for display within application display pages served by the distributed applications provider. Temporally relevant targeted advertisements can be displayed on user interface pages for any of the applications provided. For example, user data can be analyzed to select one or more advertisements for display on interfaces pages of a search engine, mapping application, email application, scheduler, and/or a payment system, among others.

Although this description generally refers to the selecting of advertisements, other forms of content are possible including other forms of sponsored content. For example, the system 100 of FIG. 1 and the system 600 of FIG. 6 are not limited to selecting content items that have a direct relationship with a product or good that is offered for sale/presented. Systems 100 and 600, and the methods described herein, can also be used to select and provide content that is not directly commercial in nature. For example, the systems can search one or more content items that provide links to news articles reporting current events, perform the temporal analysis described herein, and select one or more content items for delivery to a user based on the temporal analysis of user data.

Embodiments of the subject matter and the functional operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer program products, i.e., one or more modules of computer program instructions encoded on a tangible program carrier for execution by, or to control the operation of, data processing apparatus. The tangible program carrier can be a propagated signal or a computer-readable medium. The propagated signal is an artificially generated signal, e.g., a machine-generated electrical, optical, or electromagnetic signal, that is generated to encode information for transmission to suitable receiver apparatus for execution by a computer. The computer-readable medium can be a machine-readable storage device, a machine-readable storage substrate, a memory device, a composition of matter affecting a machine-readable propagated signal, or a combination of one or more of them.

The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them.

A computer program (also known as a program, software, software application, script, or code) can be written in any form of programming language, including compiled or interpreted languages, or declarative or procedural languages, and it can be deployed in any form, including as a stand-alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, to name just a few.

Computer-readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

While this specification contains many specific implementation details, these should not be construed as limitations on the scope of any invention or of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Particular embodiments of the subject matter described in this specification have been described. Other embodiments are within the scope of the following claims. For example, the actions recited in the claims can be performed in a different order and still achieve desirable results. As one example, the processes depicted in the accompanying fig-

The invention claimed is:

1. A method comprising:
receiving a request for an advertisement to be provided to a device of a user for display with content of a publisher web page;
in response to receiving the request, determining, by a computer system, general purchase history for a plurality of users, the general purchase history including purchases made by the plurality of users at a plurality of merchant websites that are registered with the computer system;
determining specific purchase history of the user based on the general purchase history for the plurality of users;
identifying a plurality of user purchases based on the determined specific purchase history of the user;
determining a plurality of keywords associated with the plurality of user purchases;
logging, for each of the plurality of keywords, a time of occurrence of a user purchase that was performed by the user and is associated with the keyword;
assigning higher temporal weights to keywords having a more recent time of occurrence than other keywords having a less recent time of occurrence;
identifying a plurality of advertisements based on the plurality of keywords;
ranking the identified plurality of advertisements in a descending order of the time of occurrence for the keywords used to identify the plurality of advertisements;
transmitting, by the computer system, at least one highest ranked advertisement to the device of the user for display on the publisher web page, the displayed at least one advertisement including a hyperlink;
receiving, by the computer system and from the device of the user, a selection of the hyperlink included in the at least one highest ranked advertisement and in response:
directing a web browser of the user to a merchant website associated with the at least one highest ranked advertisement, and
providing, by the computer system, to the merchant website, information previously entered by the user at the publisher web page without requiring the user to re-enter the information at the merchant website.

2. A system comprising:
data processing apparatus; and
a non-transitory computer-readable medium storing computer program instructions executable by the data processing apparatus to perform operations comprising:
receiving a request for an advertisement to be provided to a device of a user for display with content of a publisher web page;
in response to receiving the request, determining general purchase history for a plurality of users, the general purchase history including purchases made by the plurality of users at a plurality of merchant web sites that are registered with the data processing apparatus;
determining specific purchase history of the user based on the general purchase history for the plurality of users;
identifying a plurality of user purchases based on the determined specific purchase history of the user;
determining a plurality of keywords associated with the plurality of user purchases;
logging, for each of the plurality of keywords, a time of occurrence of a user purchase that was performed by the user and is associated with the keyword;
assigning higher temporal weights to keywords having a more recent time of occurrence than other keywords having a less recent time of occurrence;
identifying a plurality of advertisements based on the plurality of keywords;
ranking the identified plurality of advertisements in a descending order of the time of occurrence for the keywords used to identify the plurality of advertisements;
transmitting, by the computer system, at least one highest ranked advertisement to the device of the user for display on the publisher web page, the displayed at least one advertisement including a hyperlink;
receiving, by the computer system and from the device of the user, a selection of the hyperlink included in the at least one highest ranked advertisement and in response:
directing a web browser of the user to a merchant web site associated with the at least one highest ranked advertisement, and
providing to the merchant website, information previously entered by the user at the publisher web page without requiring the user to re-enter the information at the merchant web site.

3. A non-transitory computer-readable medium storing computer program instructions executable by data processing apparatus to perform operations comprising:
receiving a request for an advertisement to be provided to a device of a user for display with content of the publisher web page;
in response to receiving the request, determining general purchase history for a plurality of users;
determining specific purchase history of the user based on the general purchase history for the plurality of users;
identifying a plurality of user purchases based on the determined specific purchase history of the user;
determining a plurality of keywords associated with the plurality of user purchases;
logging, for each of the plurality of keywords, a time of occurrence of a user purchase that was performed by the user and is associated with the keyword;
assigning higher temporal weights to keywords having a more recent time of occurrence than other keywords having a less recent time of occurrence;
identifying a plurality of advertisements based on the plurality of keywords;
ranking the identified plurality of advertisements in a descending order of the temporal weights for the keywords used to identify the plurality of advertisements;
receiving, by the computer system and from the device of the user, a selection of the hyperlink included in the at least one highest ranked advertisement and in response:
directing a web browser of the user to a merchant website associated with the at least one highest ranked advertisement, and
providing to the merchant website, information previously entered by the user at the publisher web page without requiring the user to re-enter the information at the merchant website.

4. The method of claim 1, further comprising, for each of the plurality of identified advertisements, assigning a rank to the advertisement comprising:
- assigning a ranking score to the advertisement based on relevancy of the advertisement to the corresponding keyword that led to the identifying of the advertisement; and
- multiplying the ranking score assigned to the advertisement by the temporal weight for the corresponding keyword used to identify the advertisement to obtain the rank for the advertisement.

5. The method of claim 1, wherein a temporal weight for a keyword is a decimal value that ranges from 0 to 1.

6. The method of claim 1, further comprising:
- storing, by the computer system, information that was input by the user at the publisher web page, wherein the information is stored in association with a user identifier of the user and includes one or more items purchased by the user at the publisher web page;
- in response to receiving the selection of the hyperlink, retrieving the stored information using the user identifier; and
- processing, by the computer system, a transaction for the merchant website using the stored information.

* * * * *